US009515523B2

United States Patent
Fujita et al.

(10) Patent No.: US 9,515,523 B2
(45) Date of Patent: Dec. 6, 2016

(54) POWER SUPPLY MANAGEMENT METHOD FOR ELECTRONIC DEVICE, AND ELECTRONIC DEVICE AND POWER SUPPLYING DEVICE

(71) Applicant: FUJIFILM Corporation, Tokyo (JP)

(72) Inventors: Koudai Fujita, Saitama (JP); Ryousuke Itou, Saitama (JP); Junji Hayashi, Saitama (JP); Masanari Asano, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1 day.

(21) Appl. No.: 14/604,132

(22) Filed: Jan. 23, 2015

(65) Prior Publication Data
US 2015/0137601 A1    May 21, 2015

Related U.S. Application Data

(63) Continuation of application No. PCT/JP2013/062716, filed on May 1, 2013.

(30) Foreign Application Priority Data

Jul. 25, 2012   (JP) ................................ 2012-164997

(51) Int. Cl.
  *H02J 17/00* (2006.01)
  *H02J 7/02* (2016.01)
  (Continued)

(52) U.S. Cl.
  CPC ................ *H02J 17/00* (2013.01); *G06F 1/26* (2013.01); *H02J 5/005* (2013.01); *H02J 7/025* (2013.01);
  (Continued)

(58) Field of Classification Search
  CPC ............ H02J 17/00; H02J 5/005; H02J 7/025; G06F 1/26; H04B 5/0037
  (Continued)

(56) References Cited

U.S. PATENT DOCUMENTS 6,489,745 B1 *  12/2002  Koreis ............... B64D 11/0015
                                                    320/108
2009/0096413 A1 *  4/2009  Partovi .................. H01F 5/003
                                                    320/108
(Continued)

FOREIGN PATENT DOCUMENTS

JP    2004-206409 A    7/2004
JP    2005-94843 A     4/2005
(Continued)

OTHER PUBLICATIONS

International Preliminary Report on Patentability, issued in PCT/JP2013/062716, dated Nov. 26, 2013 (Form PCT/IPEA/409).
(Continued)

*Primary Examiner* — Thienvu Tran
*Assistant Examiner* — David M Stables
(74) *Attorney, Agent, or Firm* — Birch, Stewart, Kolasch & Birch, LLP

(57) ABSTRACT

A power supply management method for electronic devices includes: an electric power transmission step of wirelessly transmitting electric power to each of electronic devices 50, 60 placed on a table 10 from a power supplying device 20 contained in the top plate of the table 10; a step of receiving electric power transmitted from the power supplying device 20 by each of the electronic devices 50, 60; and a step of activating the system of each of the electronic devices by the electronic devices 50, 60 when the electric power is received
(Continued)

from the power supplying device 20 and an amount of the received electric power is equal to or larger than a threshold value for system activation.

7 Claims, 11 Drawing Sheets

(51) Int. Cl.
  *H04B 5/00* (2006.01)
  *G06F 1/26* (2006.01)
  *H02J 5/00* (2016.01)
(52) U.S. Cl.
  CPC .......... *H04B 5/0037* (2013.01); *Y10T 307/406* (2015.04)
(58) Field of Classification Search
  USPC .................................................... 307/31, 104
  See application file for complete search history.

(56) References Cited

U.S. PATENT DOCUMENTS

| | | | | |
|---|---|---|---|---|
| 2009/0284245 A1* | 11/2009 | Kirby | ................... | G06K 7/0008 323/318 |
| 2010/0001685 A1* | 1/2010 | Eastlack | ................. | H02J 7/025 320/108 |
| 2010/0181961 A1* | 7/2010 | Novak | .................... | H02J 7/025 320/108 |
| 2010/0194206 A1* | 8/2010 | Burdo | ..................... | G06F 1/266 307/104 |
| 2010/0277003 A1* | 11/2010 | Von Novak | ............. | H02J 17/00 307/104 |
| 2012/0049942 A1 | 3/2012 | Mori | | |

FOREIGN PATENT DOCUMENTS

| | | |
|---|---|---|
| JP | 2008-36101 A | 2/2008 |
| JP | 2011-82653 A | 4/2011 |
| JP | 2012-53540 A | 3/2012 |
| JP | 2013-43046 A | 3/2013 |

OTHER PUBLICATIONS

International Preliminary Report on Patentability, issued in PCT/JP2013/062716, dated Nov. 19, 2013.
International Search Report, issued in PCT/JP2013/062716, dated Jul. 23, 2013.
Written Opinion of the International Searching Authority, issued in PCT/JP2013/062716, dated Jul. 23, 2013.

* cited by examiner

FIG. 5

| MASTER DEVICE ID | SLAVE DEVICE ID | | |
|---|---|---|---|
| 001 | 001-S01 | 001-S02 | 001-S03 |
| 002 | 002-S01 | | |
| 003 | 003-S01 | 003-S02 | |
| . | . | . | . |
| . | . | . | . |
| . | . | . | . |

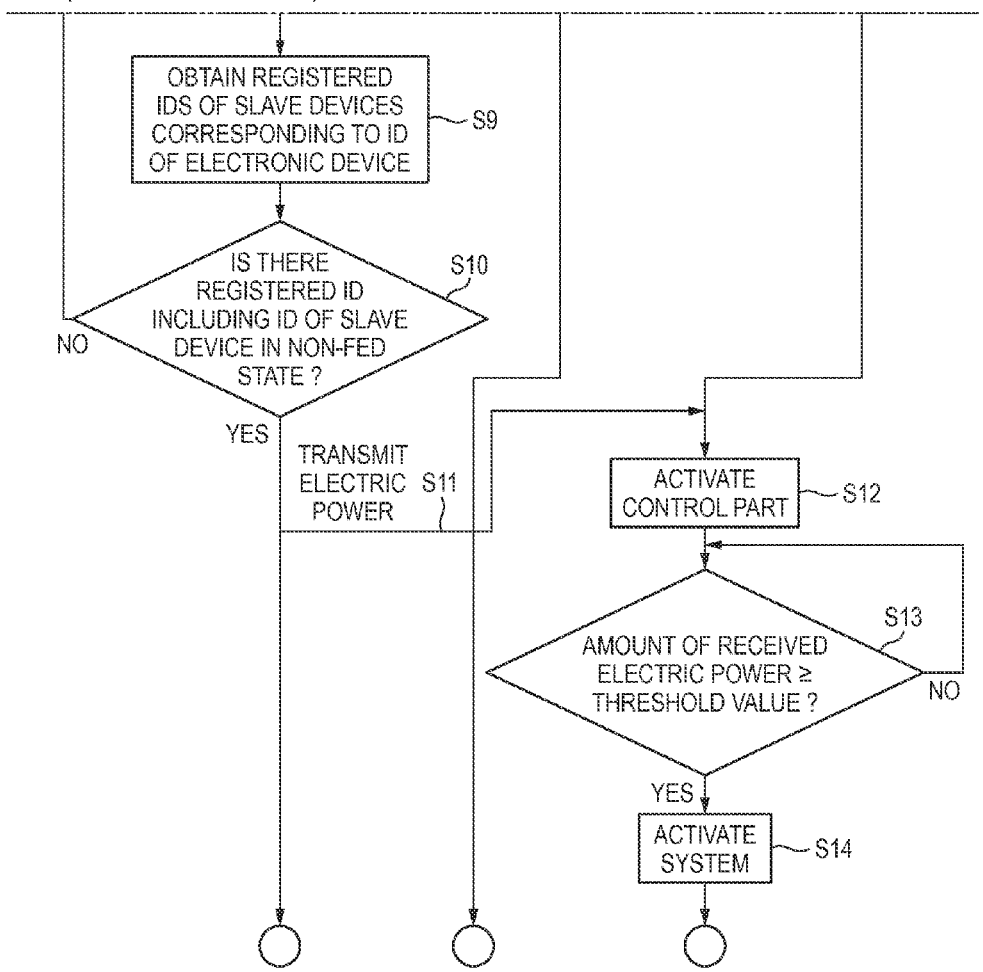

POWER SUPPLY MANAGEMENT METHOD FOR ELECTRONIC DEVICE, AND ELECTRONIC DEVICE AND POWER SUPPLYING DEVICE

CROSS REFERENCE TO RELATED APPLICATION

This is a continuation of International Application No. PCT/JP2013/062716 filed on May 1, 2013, and claims priority from Japanese Patent Application No. 2012-164997 filed on Jul. 25, 2012, the entire disclosures of which are incorporated herein by reference.

BACKGROUND

Technical Field

The present invention relates to a power supply management method for electronic devices.

Related Art

In an office, work is carried out using a plurality of electronic devices such as a computer, a printer and a projector. Such the electronic devices are used usually in a state of being placed on a table and become usable when supplied with electric power via cables and adaptors from an outlet arranged usually near the table.

In recent years, due to widespread use of various kinds of electronic devices, many cables, adaptors, chargers etc. are required for power supplying. As a result, since these cables etc. are disposed on the table and in the periphery thereof in a disorderly fashion, there arise problems such as spoiling of appearance and degradation of working efficiency.

In order to solve such the problems, techniques disclosed in patent literature 1 (JP-A-2005-94843) and patent literature 2 (JP-A-2008-36101) are proposed.

Each of the patent literatures 1 and 2 discloses a system in which an electronic device is supplied with electric power from a desk by merely placing the electronic device containing a power receiving coil on the top plate of the desk containing a power supplying coil.

SUMMARY OF INVENTION

In recent years, due to the declining of economic environment, it has been demanded to advance work efficiently. The system in each of the patent literatures 1 and 2 can attain such effects that the disordering state on a desk can be prevented and the unusable state of an electronic device due to forgetting of charging of the electronic device can also be prevented. However, these related arts are not sufficient in a view point of advancing work efficiently.

In view of above, illustrative aspect(s) of this invention are to provide a power supply management method for electronic devices which can advance work such as a conference efficiently.

An aspect of the invention provides a power supply management method for an electronic device which can wirelessly receive electric power from a power supplying device having a plurality of electric power transmission parts each wirelessly transmitting electric power, including: an electric power transmission step of wirelessly transmitting electric power to the electronic device by the power supplying device; a step of receiving electric power transmitted from the power supplying device by the electronic device; a step of determining by the electronic device whether or not an amount of the electric power received from the power supplying device is equal to or larger than a threshold value necessary for activating a system of the electronic device; and a system activation step of activating by the electronic device the system when the amount of the received electric power is equal to or larger than the threshold value.

Another aspect of the invention provides a power supply management program executable by a computer, including the respective steps performed by the electronic device in the power supply management method for the electronic device.

Another aspect of the invention provides an electronic device, including: an electric power receiving unit which wirelessly receives electric power from a power supplying device that includes a plurality of electric power transmission units each for wirelessly transmitting electric power; a determination unit which determines whether or not an amount of the electric power received by the electric power receiving unit is equal to or larger than a threshold value necessary for activating a system of the electronic device; and an activation control unit which activates the system when the amount of received electric power is equal to or larger than the threshold value.

Another aspect of the invention provides a power supplying device, including: a plurality of electric power transmission units each for wirelessly transmitting electric power; and an electric power transmission control unit which transmits electric power to electronic devices from the electric power transmission units, in which the electronic devices include a master device which is used independently and a slave device which is used by being connected to the master device, and the electric power transmission control unit transmits electric power to the slave device only when electric power is transmitted to the master device to be connected to the slave device.

According to any one of the aspects of the invention, the power supply management method for electronic devices which can efficiently advance work such as a conference can be provided.

BRIEF DESCRIPTION OF DRAWINGS

FIG. 5 is a diagram showing an example of a table registered in the database 40 of a power supply management system 100a which is the first modified example of the power supply management system 100.

FIG. 6 is a sequence chart for explaining the operation of the power supply management system 100a.

FIG. 7 is a flowchart for explaining the modified example of the activation processing of the electronic device in each of the power supply management systems 100, 100a.

FIG. 8 is a flowchart for explaining another modified example of the activation processing of the electronic device in each of the power supply management systems 100, 100a.

DESCRIPTION OF EMBODIMENTS

Hereinafter, an embodiment and modified examples of the invention will be explained with reference to drawings.

Figure 1:
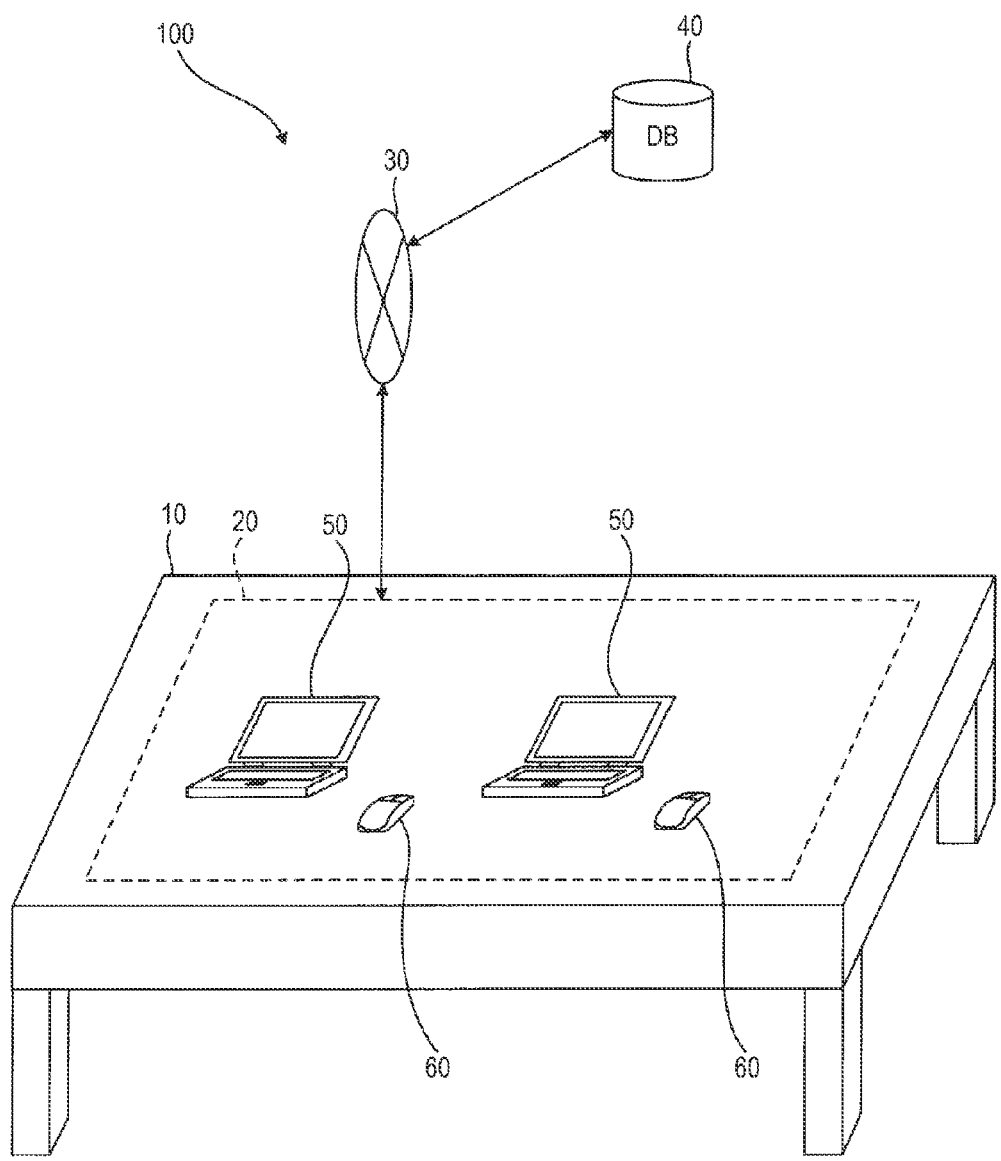
FIG. 1 is a diagram showing the schematic configuration of a power supply management system 100 for explaining an embodiment of the invention.

FIG. 1 is a diagram showing the schematic configuration of a power supply management system 100 for explaining the embodiment of the invention.

The power supply management system 100 includes a table 10 in which a power supplying device 20 is incorporated, a network 30 such as the internet, and a database 40.

The power supplying device 20 and the network 30 are connected to each other in a wired or wireless manner. The database 40 is connected to the network 30 in a wired or wireless manner. The database 40 may be located at a position accessible from the power supplying device 20, or contained in the power supplying device 20 or connected to the power supplying device 20 without intervening the network 30.

The table 10 is disposed in an office, for example. The power supplying device 20 contained in the table 10 wirelessly transmits electric power to electronic devices (notebook computers 50 and mouses 60 in the example of FIG. 1) mounted on a top plate as a plane member.

Figure 2:
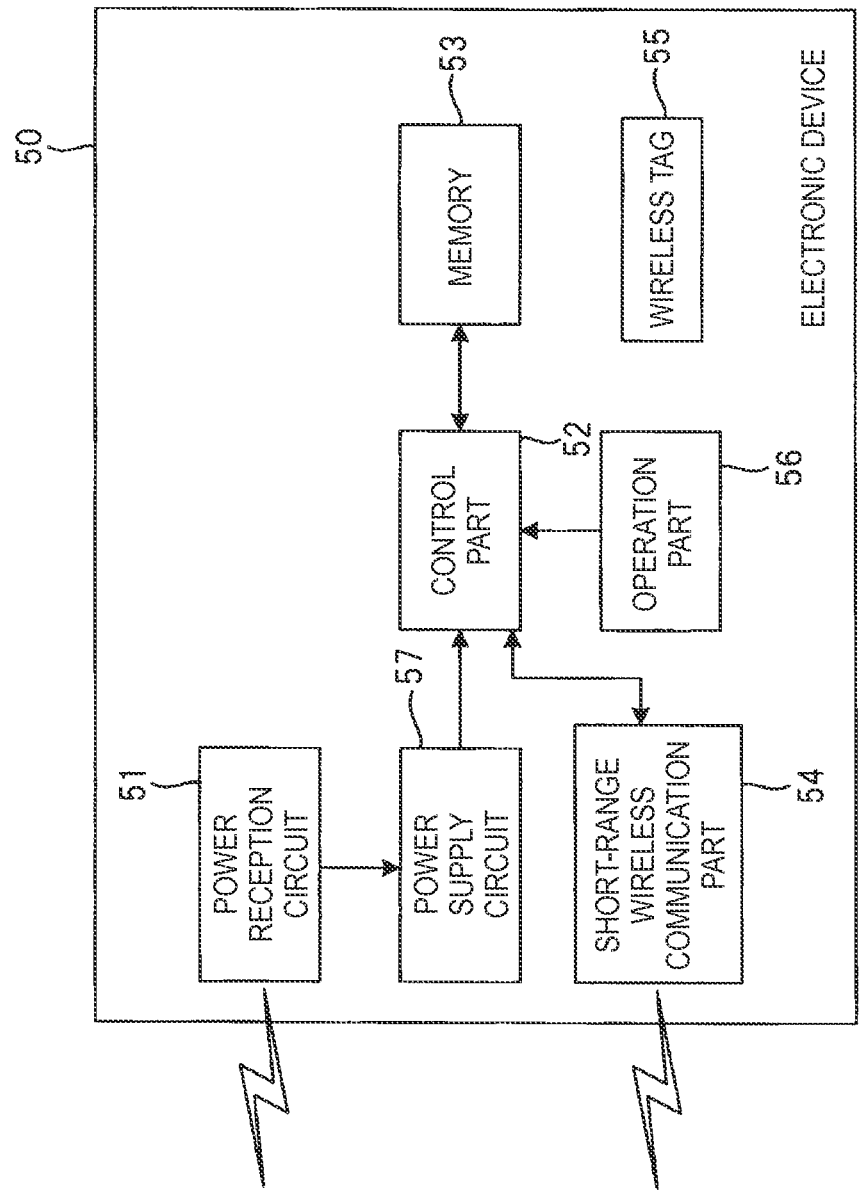
FIG. 2 is a diagram showing the internal configuration of a notebook computer 50 as an electronic device used in the power supply management system 100 shown in FIG. 1.

FIG. 2 is a diagram showing the internal configuration of the notebook computer 50 as the electronic device used in the power supply management system 100 shown in FIG. 1. Since the mouse 60 is common to the notebook computer 50 except for blocks for realizing the main function, the explanation will be made as to only the internal configuration of the notebook computer 50.

The notebook computer 50 includes a power reception circuit 51, a control part 52 for integrally controlling the entire configuration of the computer, a memory 53, a short-range wireless communication part 54, a wireless tag 55, an operation part 56 and a power supply circuit 57.

The power reception circuit 51 includes a not-shown power receiving coil. The power reception circuit 51 receives electric power wirelessly supplied from the power supplying circuit 21 of the power supplying device 20 and transmits the received electric power to the power supply circuit 57.

The power supply circuit 57 generates a voltage necessary for operating the notebook computer 50 from the electric power transmitted from the power reception circuit 51 and supplies the voltage thus generated to the respective constituent elements of the computer via the control part 52.

The memory 53 includes an RAM acting as a work memory and an ROM storing various kinds of programs. Respective processing to be performed by the control part 52 of the notebook computer 50 is attained when a processor (computer) constituting the control part 52 executes the programs stored in the ROM.

The short-range wireless communication part 54 wirelessly communicates with other devices without intervening the network 30. The short-range wireless communication part 54 is configured by a communication module etc. conformed to the standard such as Bluetooth (trade mark).

The wireless tag 55 stores an ID specific to the notebook computer 50.

The operation part 56 is an interface for inputting instructions etc. from the outside into the control part 52.

When the power reception circuit 51 receives electric power from the power supplying device 20, the control part 52 of the notebook computer 50 is activated by the electric power thus received and determines, based on an amount of the electric power received by the power reception circuit 51, whether or not a system (system such as an operating system necessary for realizing the main function of the electronic device) of the notebook computer 50 is to be activated. When the amount of electric power received by the power reception circuit 51 is equal to or larger than a threshold value for system activation which is a minimum value necessary for fully activating the entire system, the control part 52 executes program necessary for the system activation of the notebook computer 50 stored in the memory 53 to thereby activate the system.

Figure 3:
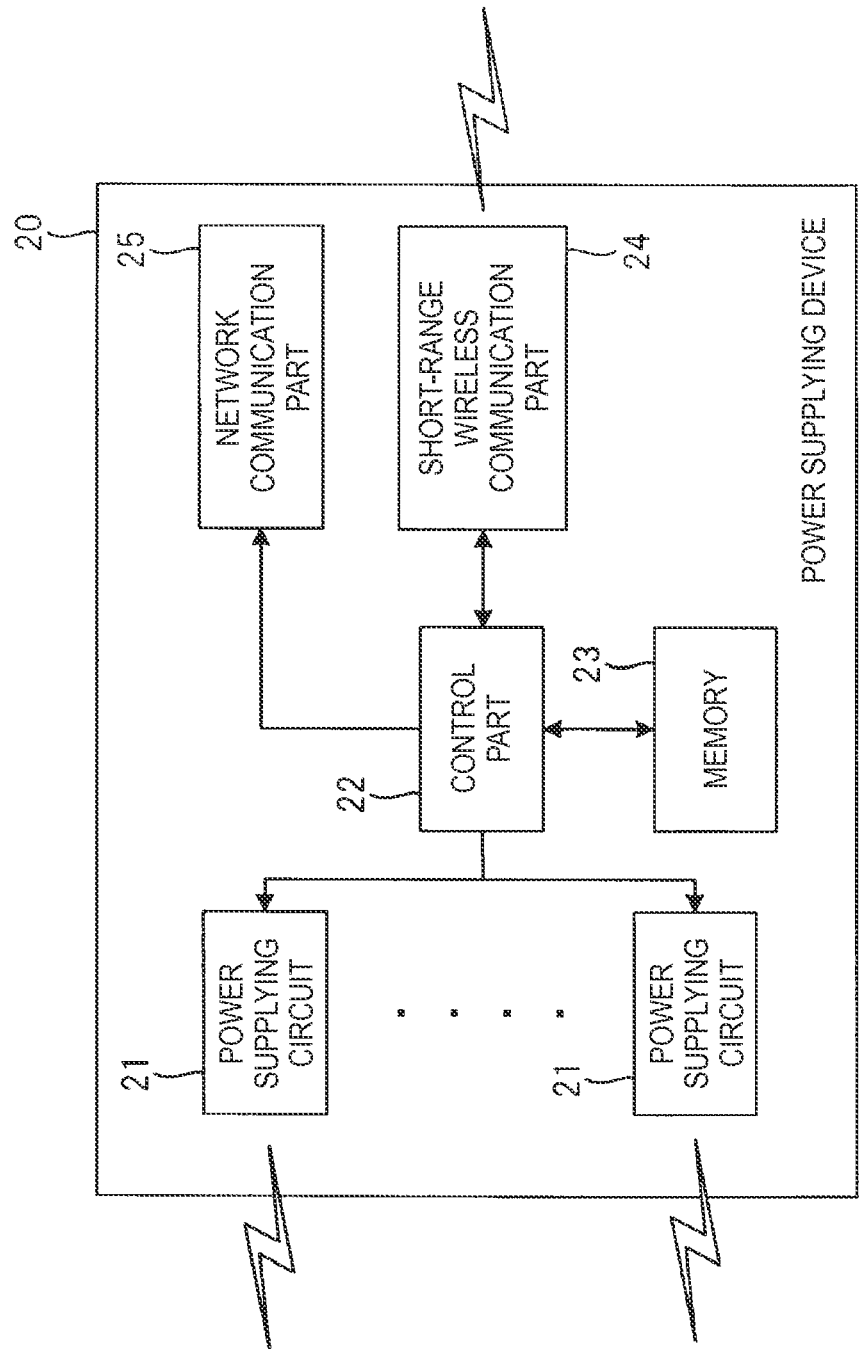
FIG. 3 is a diagram showing the internal configuration of a power supplying device 20 used in the power supply management system 100 shown in FIG. 1.

FIG. 3 is a diagram showing the internal configuration of the power supplying device 20 used in the power supply management system 100 shown in FIG. 1.

The power supplying device 20 is operated by electric power supplied from a not-shown outlet. The power supplying device includes a plurality of power supplying circuits 21, a control part 22 for integrally controlling the entire configuration of the power supplying device, a memory 23 having an RAM and an ROM etc., a short-range wireless communication part 24 and a network communication part 25.

Each of the power supplying circuits 21 includes a power supplying coil (not shown) and a wireless tag reader (not shown) for reading the information of the wireless tag 55 of the notebook computer 50.

The respective power supplying circuits 21 are disposed two-dimensionally on the same plane of the top plate of the table 10. When the power receiving coil of the notebook computer 50 overlaps with one of the plurality of power supplying coils, electric power can be supplied to the power receiving coil from the one power supplying coil.

In this manner, the table 10 used for the power supply management system 100 is configured that the electronic device can be supplied with electric power so long as it is placed on any position of the table where the power supplying coil is disposed.

In the power supplying device 20, the control part 22 controls electric power transmitted from the power supplying circuit 21 depending on the number of the electronic devices to be fed. The total amount of electric power that can be supplied from the plurality of power supplying circuits 21 is determined in advance. Thus, for example, the control part 22 controls the power supplying circuits 21 in a manner that an amount of electric power to be transmitted from each of the power supplying circuits 21 is determined by dividing the total amount of electric power by the number of the electronic devices to be fed. When the minimum amount of electric power transmitted from each of the power supplying circuits 21 is determined in advance, each of the power supplying circuits 21 can transmit electric power in a range from the minimum amount to the total amount.

The short-range wireless communication part 24 communicates with other devices containing the notebook computers 50 without intervening the network 30. The short-range wireless communication part 24 is configured by a communication module etc. conformed to the standard such as Bluetooth (trade mark).

The network communication part 25 is a communication interface for performing communication with other devices via the network 30.

The database 40 of the power supply management system 100 shown in FIG. 1 stores the IDs of the electronic devices registered in advance with respect to this system.

The operation of the power supply management system 100 configured in this manner will be explained.

Figure 4:
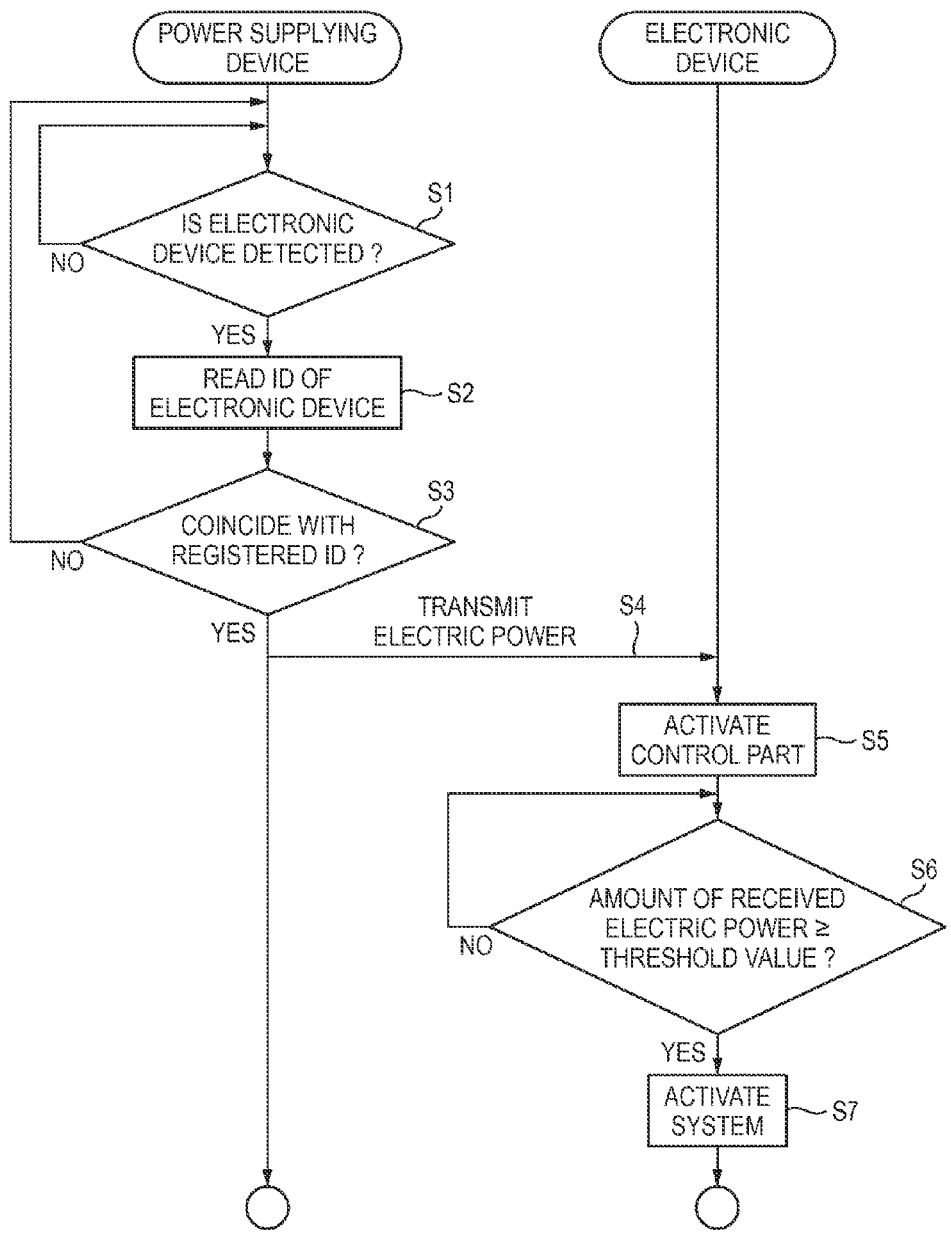
FIG. 4 is a sequence chart for explaining the operation of the power supply management system 100 shown in FIG. 1.

FIG. 4 is a sequence chart for explaining the operation of the power supply management system 100 shown in FIG. 1.

When a user places the notebook computer 50 on the table 10, the control part 22 of the power supplying device 20 contained in the table 10 detects that the notebook computer 50 is placed on the table 10 (step S1: YES).

For example, the control part 22 detects the change of a current or a voltage generated in the power supplying coil when the power receiving coil approaches the power supplying coil to thereby detect that the notebook computer 50 is placed on the table 10.

When the control part 22 of the power supplying device 20 detects that the notebook computer 50 is placed on the table 10, this control part reads the ID of this notebook computer 50 from the wireless tag 55 contained in this notebook computer 50 (step S2).

Then, the control part 22 of the power supplying device 20 determines whether or not the ID thus read is stored in the database 40 (step S3). When this ID is stored in the database (step S3: YES), the corresponding power supplying circuit 21 starts to supply electric power to the power reception circuit 51 of this notebook computer 50 (step S4). When this ID is not stored in the database 40 (step S3: NO), the control part 22 of the power supplying device 20 does not start the supply of electric power and is placed in a standby state until the electronic device is detected again.

When the supply of electric power is started in step S4, the control part 52 of the notebook computer 50 placed on the table 10 is activated by electric power received by the power reception circuit 51 (step S5). Then, the control part 52 detects an amount of electric power received by the power reception circuit 51 and compares the detected amount of electric power with the threshold value for system activation (step S6).

As a result of the comparison, when the detected amount of electric power is equal to or larger than the threshold value for system activation (step S6: YES), the control part 52 executes the start program of the notebook computer 50 to thereby activate the notebook computer 50 in step S7. In contrast, when the detected amount of electric power is smaller than the threshold value for system activation (step S6: NO), the control part is placed in a standby state until the detected amount of electric power becomes equal to or larger than the threshold value for system activation.

The aforesaid operation is performed each time the electronic device configured as shown in FIG. 2 is placed on the table 10. For example, concerning the mouse 60 used together with the notebook computer 50, when the mouse is merely placed on the table 10, the mouse 60 is also supplied with electric power from the power supplying device 20 and hence becomes usable.

As described above, according to this power supply management system 100, by merely placing the electronic device on the table 10, supply of electric power to the electronic device can be started and further activation of the electronic device can be performed. Thus, since it is not necessary to separately perform the operation for activating the electronic device, a time period required for placing the electronic device in a usable state can be shortened.

For example, in a case of preparing a conference by disposing a plurality of notebook computers 50 on the table 10, a work for activating the respective notebook computers 50 can be eliminated. Therefore, since labor and time required for preparing a conference can be saved, a conference can be prepared efficiently.

Further, according to this power supply management system 100, in the notebook computer 50, the system of the computer is activated only when an amount of the electric power received from the power supplying device 20 is equal to or larger than the threshold value for system activation. Thus, the system of the computer can be prevented from being activated in a shortage state of an amount of the received electric power, so that the notebook computer 50 can be activated stably.

Furthermore, since this power supply management system 100 uses the electronic devices each of which does not mount a battery charging electric power required for activating the electronic device, such a situation can be prevented from occurring that the electronic device can not be operated due to the insufficient residual charge amount. Thus, the business efficiency can be improved. Further, since standby power can be eliminated, energy saving can be realized.

Furthermore, according to this power supply management system 100, since each of the electronic devices does not mount a battery, the electronic devices can be made use only on the table 10 belonging to this power supply management system 100. Thus, the electronic devices can be prevented from being used outside a predetermined place and hence the security can be improved.

Next, a modified example of the power supply management system 100 will be explained.

First Modified Example

In a power supply management system 100a according to the first modified example, the electronic devices are classified into the electronic devices (hereinafter called master devices) each used independently and the electronic devices (hereinafter called slave devices (peripheral devices)) each used by being connected to the master device. Information stored in the database 40 is made different between the mater devices and the slave devices. For example, the notebook computer 50 is the master device, whilst the mouse 60 used by being connected to the notebook computer 50 is the slave device. Other slave devices are a printer, a projector etc. each used by being connected to the notebook computer 50.

FIG. 5 shows an example of a table registered in the database 40 of the power supply management system 100a.

The database 40 stores, in correspondence to the IDs of the master devices, IDs of the slave devices which are linked with the IDs of the corresponding master devices, respectively.

In an example shown in the uppermost line in FIG. 5, in correspondence to the master device with the ID of 001, three IDs, that is, ID of 001-S01, ID of 001-S02 and ID of 001-S03 are stored as the IDs of three slave devices having IDs of S01, S02 and S03 stored in the wireless tag 55, respectively.

Figure 6:
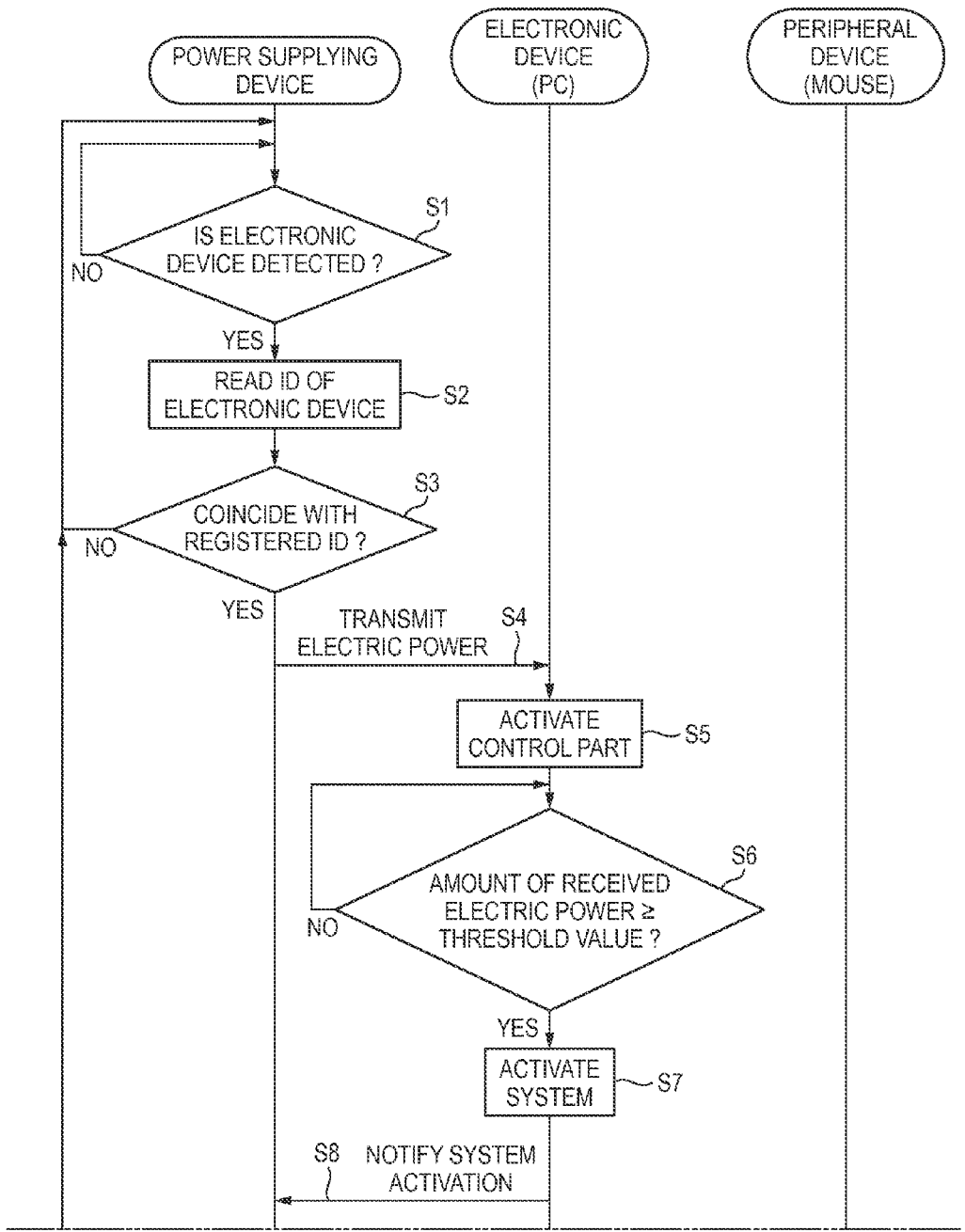

Next, the operation of the power supply management system 100a will be explained. Hereinafter, the explanation will be made as to a case where the notebook computer 50 as the master device and the mouse 60 as the slave device are placed on the table 10. FIG. 6 is a sequence chart for explaining the operation of the power supply management system 100a.

The operation until the notebook computer 50 is activated after the notebook computer 50 is placed on the table 10 is same as FIG. 4. In this respect, concerning the mouse 60, since the ID of the mouse 60 and the ID registered in the database 40 does not coincide in the determination of step S3, the mouse is not fed from the power supplying device 20.

After the system of the computer is activated, the control part 52 of the notebook computer 50 notifies to the power supplying device 20 via the short-range wireless communication part 54 that the system of the computer is activated (step S8).

When the power supplying device 20 receives the notification of system activation, the control part 22 of this power supplying device obtains, from the database 40, the IDs of the slave devices corresponding to the ID of the notebook computer 50 which has sent the notification of system activation (step S9). Then, this control part compares each of the IDs thus obtained with the ID read from the electronic device (mouse 60 in this case) having not been fed yet among the electronic devices placed on the table 10 (step S10).

For example, when the ID of the notebook computer 50 placed on the table 10 is 001, the control part 22 of the power supplying device 20 obtains the IDs (registered IDs) of 001-S01, 001-S02 and 001-S03 from the database 40. Then, when the registered IDs thus obtained contains the ID read from the electronic device (mouse 60 in this case) having not been fed yet among the electronic devices placed on the table 10 (step S10: YES), electric power is transmitted to the mouse 60 having this ID registered in the wireless tag 55 (step S11).

In contrast, when the registered IDs thus obtained do not contain the ID read from the electronic device (mouse 60 in this case) having not been fed yet among the electronic devices placed on the table 10 (step S10: NO), the control part 22 of the power supplying device 20 is placed in the standby state until the electronic device is detected again.

In the mouse 60 transmitted with electric power in step S11, the control part 52 is activated by electric power received by the power reception circuit 51 (step S12). Then, the control part 52 detects an amount of electric power received by the power reception circuit 51 and compares the detected amount of electric power with the threshold value for system activation (step S13).

As a result of the comparison, when the detected amount of electric power is equal to or larger than the threshold value for system activation (step S13: YES), the control part 52 executes the start program of the mouse 60 to thereby activate the mouse 60 in step S14. In contrast, when the detected amount of electric power is smaller than the threshold value for system activation (step S13: NO), this control part is placed in the standby state until the detected amount of electric power becomes equal to or larger than the threshold value for system activation.

In a state that each of the notebook computer 50 and the mouse 60 is activated after performing step S7 and step S14, when the notebook computer 50 is removed from the table 10, the control part 22 of the power supplying device 20 detects this removal.

Then, the control part 22 of the power supplying device 20 stops the transmission of electric power from the power supplying coil to the notebook computer 50 thus removed.

Thereafter, the control part 22 of the power supplying device 20 specifies the slave device being fed which corresponding to the ID of the notebook computer 50 thus removed, and also stops the transmission of electric power to the specified slave device.

In a case of the slave device such as a printer connectable to a plurality of the master devices, when the control part 22 of the power supplying device 20 determines that all of the master devices corresponding to the slave device are removed from the table 10, the control part may stop the transmission of electric power to this slave device.

As described above, according to the power supply management system 100a, after the supply of electric power to the master device, the supply of electric power to the slave device is started to thereby activate the slave device. The slave device such as a mouse, a printer or a projector is basically not used in a state where the master device is not activated. Thus, by activating these slave devices after activating the master device, excessive power consumption in the slave devices can be avoided and hence energy saving in an office can be realized.

The power supply management system 100a is particularly effective, for example, in a so-called shared office in which respective desks for employees are not provided and desks having number smaller than the number of the employees are shared to thereby save the space cost.

For example, in a case where a printer as the slave device is placed on each desk in the power supply management system 100a, when the notebook computer as the master device is not placed on one desk, the printer on the one desk is not activated. Thus, waste power consumption can be suppressed. Further, when the notebook computer is placed on one desk, since the printer on the one desk is automatically turned on, the tuning-on operation of the printer is not required.

The slave device such as a printer tends to be left in a turned-on state. Thus, when the slave device is controlled so as to be turned on only when the master device is placed on the desk, energy saving can be realized.

Incidentally, in FIG. 6, the processing of step S8 may be omitted and the power supplying device 20 may perform the processing of step S9 after performing the processing of step S4. In this case, since the slave devices can be activated without waiting for the activation of the master device, a time required for placing each of a plurality of the electronic devices in a usable state can be shortened.

Second Modified Example

In the second modified example, the explanation will be made as to a modified example of the activation processing of the electronic device in each of the power supply management systems 100, 100a.

Figure 7:
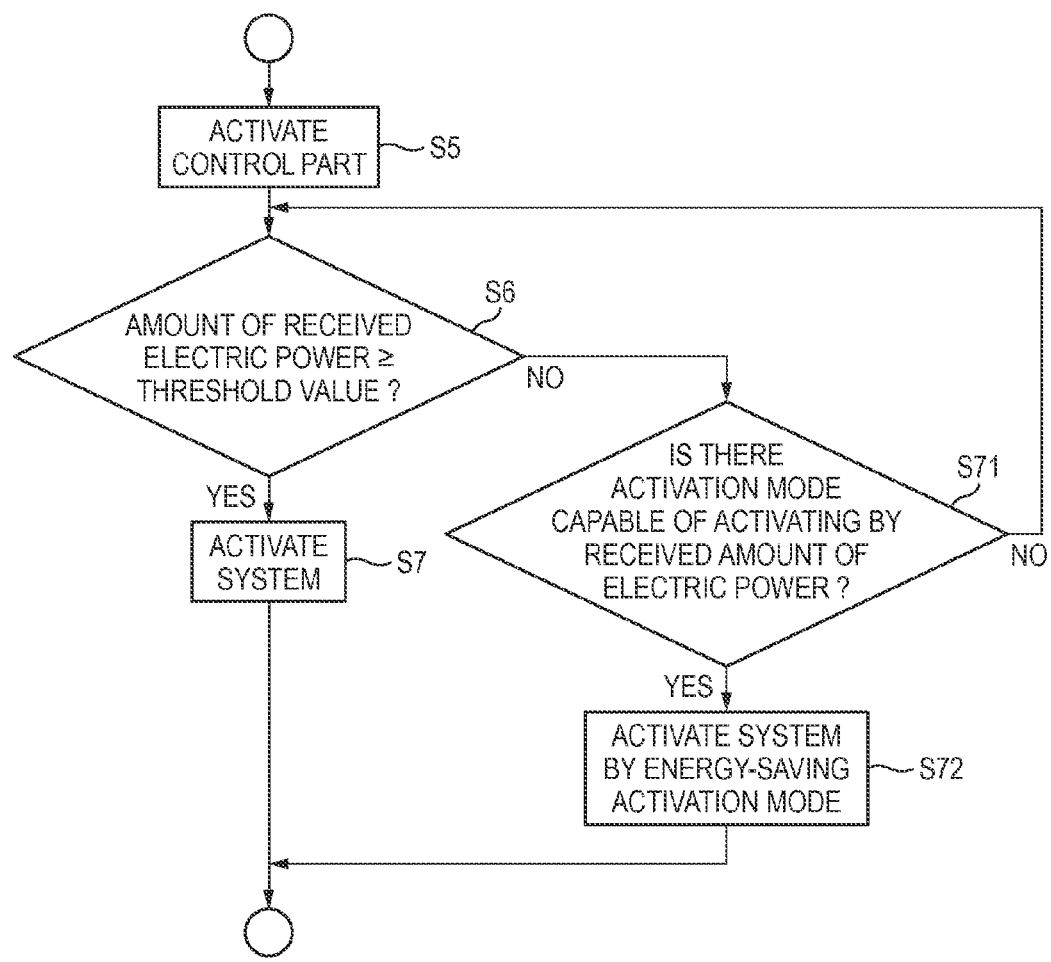

FIG. 7 is a flowchart for explaining the modified example of the activation processing of the electronic device in each of the power supply management systems 100, 100a. FIG. 7 shows the operation after the control part 52 of the electronic device is activated. In FIG. 7, the respective processing identical to those of FIGS. 4 and 6 are referred to by the common symbols The activating processing of the control part 52 in step S5 and the operation after the affirmative determination in step S6 are same as FIGS. 4 and 6.

In this modified example, the system of the electronic device 50 can be activated according to plural kinds of system activation modes different in a necessary amount of electric power. For example, it is possible to select either one of a full activation mode for activating the entire system of the electronic device by a charging current of 3 A and an energy-saving activation mode for activating a part of the system of the electronic device by the charging current of 2 A. For example, the threshold value for system activation is 3 A·100V (in a case that the voltage supplied from an outlet connected to the power supplying device 20 is 100V).

When it is determined NO in step S6, the control part 52 determines whether or not there is the activation mode capable of activating the system of the electronic device by an amount of electric power received by the power reception circuit 51. When it is determined that the amount of electric power is sufficient for the energy-saving activation mode (step S71: YES), the system of the electronic device is activated by the energy-saving activation mode (step S72).

In contrast, when the amount of electric power is insufficient for the energy-saving activation mode (step S71: NO), the processing returns to step S6.

As described above, according to this modified example, even when an amount of electric power supplied to the electronic device 50 is small, the system of the electronic device 50 can be activated by the activation mode capable of activating the system by such the small amount of electric power. Thus, even when many electronic devices are placed on the table 10, the number of electronic devices 50 which systems are not activated can be reduced.

Third Modified Example

In the third modified example, the explanation will be made as to another modified example of the activation processing of the electronic device in each of the power supply management systems 100, 100a.

Figure 8:
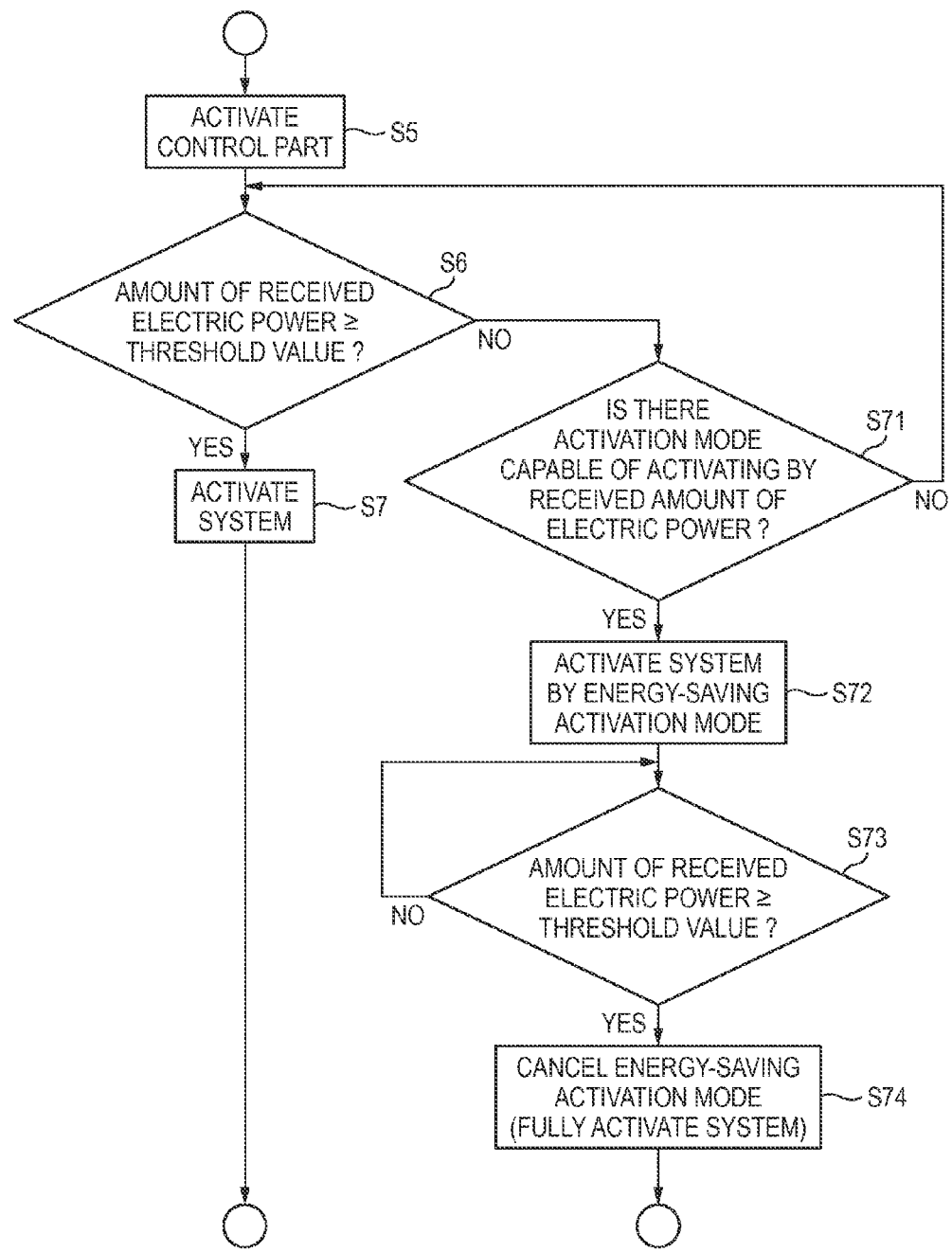

FIG. 8 is a flowchart for explaining the modified example of the activation processing of the electronic device in each of the power supply management systems 100, 100a. In FIG. 8, the respective processing identical to those of FIG. 7 are referred to by the common symbols When a part of the system of the electronic device is activated by the processing of step S72, the control part 52 of the electronic device 50 compares an amount of electric power being received by the power reception circuit 51 with the threshold value for system activation (step S73).

As the result of the comparison, when the amount of electric power being received is equal to or larger than the threshold value for system activation (step S73: YES), the control part 52 cancels the energy-saving activation mode. That is, the control part activates the remaining part of the system having not been activated to thereby activate the entire system of the electronic device (step S74).

As described above, according to this modified example, even if the electronic device is activated by the energy-saving activation mode, the system of the electronic device can be fully activated when an amount of received electric power becomes equal to or larger than the threshold value for system activation. Thus, the electronic device 50 can be used without limitation.

Fourth Modified Example

In this modified example, the energy saving of the electronic device is further intended in each of the power supply management systems 100, 100a.

To be concrete, when a user does not perform any operation for a predetermined time period with respect to the electronic device having been activated, the control part 22 of the power supplying device 20 stops the transmission of electric power to the electronic device. The predetermined time period is a time period determined in advance on the electronic device side and can be set arbitrarily by a user of the electronic device.

Figure 9:
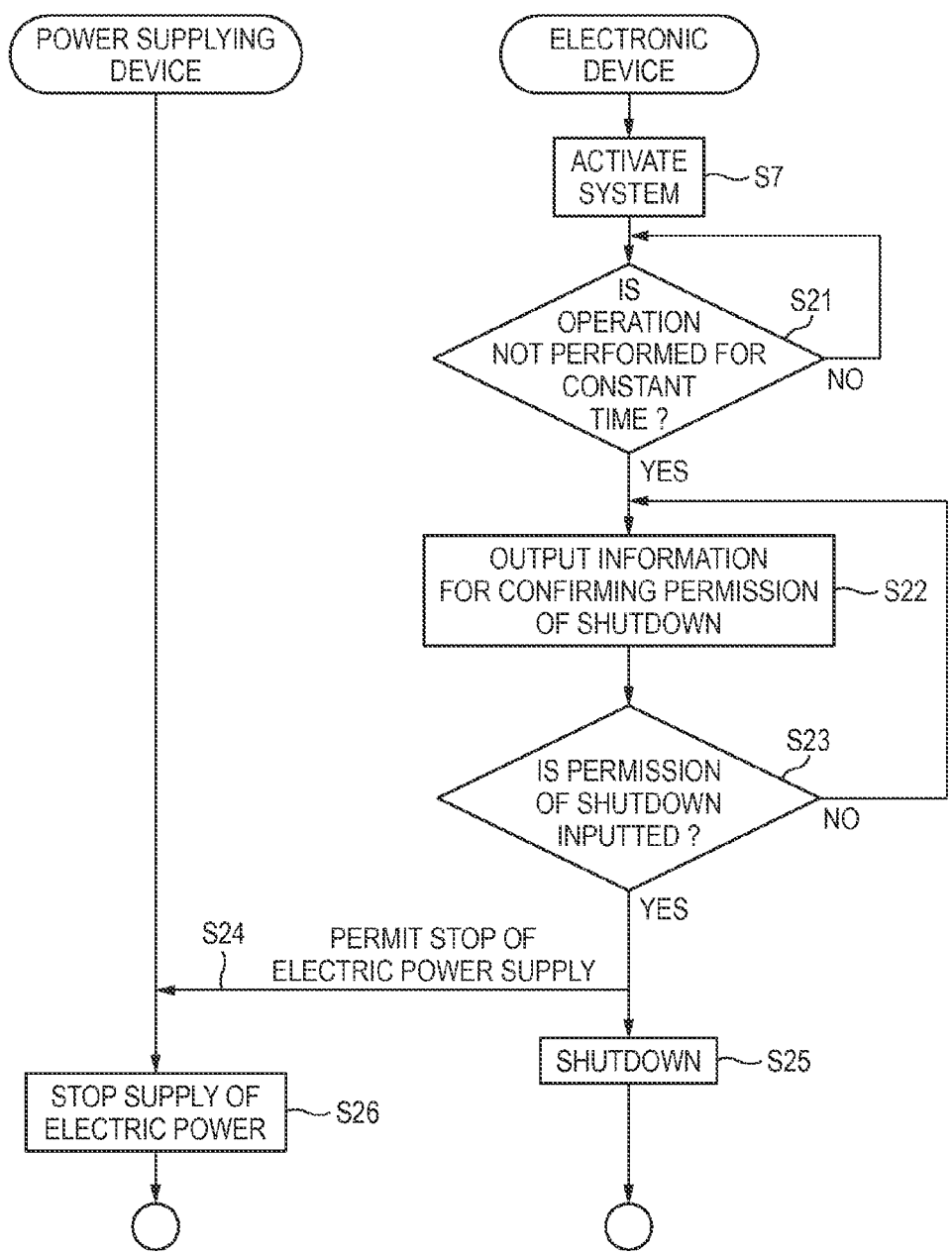
FIG. 9 is a sequence chart for explaining the operation of the fourth modified example of the power supply management system 100.

FIG. 9 is a sequence chart for explaining the operation of the fourth modified example of the power supply management system 100. FIG. 9 shows the operation of step S7 in FIG. 4 and operations of the succeeding steps.

After step S7, the control part 52 of the notebook computer 50 monitors the operation with respect to the operation part 56. When the operation is not performed for a constant time period (step S21: YES), the control part performs a control of outputting information for confirming a permission of shutdown of the system (step S22). For example, a not-shown display part or a speaker etc. outputs a message such as "Is it OK to shutdown the system since no operation is performed for a constant time period?"

When a user of the notebook computer 50 performs an operation of permitting the shutdown according to the message (step S23: YES), the control part 52 of the notebook computer 50 transmits an electric-power supply stop permission signal for permitting the stop of supply of electric power to the power supplying device 20 (step S24). Thereafter, the control part 52 of the notebook computer 50 performs the shutdown processing of the system of the computer (step S25).

When the control part 22 of the power supplying device 20 receives the electric-power supply stop permission signal, after the lapse of a predetermined time period necessary for the shutdown processing of the electronic device, the control part stops the transmission of electric power to the notebook computer 50 having sent the electric-power supply stop permission signal (step S26).

In this manner, when the electronic device which system was activated is not operated for the constant time period, the supply of electric power to this electronic device from the power supplying device 20 is stopped. Thus, the waste power consumption can be reduced and energy saving can be realized.

Incidentally, the processing of step S21 and the succeeding processing shown in FIG. 9 may be performed after step S72 in each of FIGS. 7 and 8.

Fifth Modified Embodiment

FIG. 9 shows the example in which the supply of electric power to the electronic device is stopped when the operation is not performed for the constant time period. In the fifth modified example, energy saving is intended not by stopping the supply of electric power to the electronic device but by reducing an amount of electric power supplied thereto.

Figure 10:
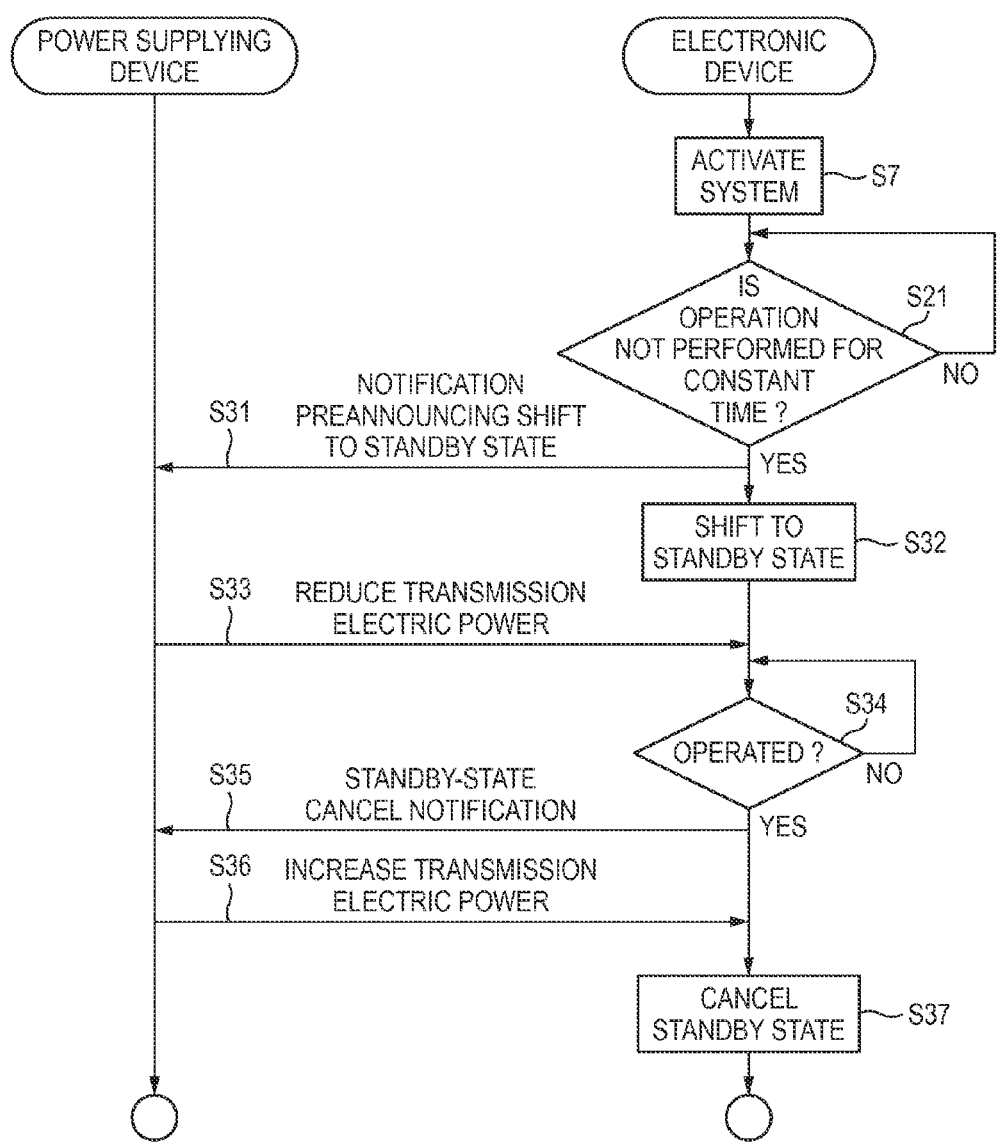
FIG. 10 is a sequence chart for explaining the operation of the fifth modified example of the power supply management system 100.

FIG. 10 is a sequence chart for explaining the operation of the fifth modified example of the power supply management system 100. In FIG. 10, the processing up to step S21 is same as the processing of FIG. 9.

When it is determined YES in step S21, the control part 52 of the notebook computer 50 transmits information preannouncing the shift to a standby state to the power supplying device 20 (step S31). Thereafter, the control part 52 of the notebook computer 50 performs processing of shifting to the standby state (step S32).

The standby state represents a state in which, in order to suppress an amount of power consumption, for example, electric power is supplied only to minimum circuit portions necessary for operating the system or a clock frequency is reduced.

When the control part 22 of the power supplying device 20 receives the information preannouncing the shift to the standby state, after the lapse of a predetermined time period necessary for the notebook computer 50 having sent this information is placed in the standby state, this control part performs a control of reducing an amount of electric power transmitted to the notebook computer 50 as compared with the amount having been transmitted heretofore (step S33).

Alternatively, the control part 52 of the notebook computer 50 may firstly perform the processing of step S32 when it is determined YES in step S21. Then, after completing the shift to the standby state, this control part may transmit information denoting that the shift to the standby state is completed to the power supplying device 20. In this case, the control part 22 of the power supplying device 20 performs the control of reducing an amount of electric power transmitted to the notebook computer 50 in response to the reception of the information denoting the completion of the shift to the standby state.

In the notebook computer 50 which is placed in the standby state in step S32, the control part 52 monitors whether or not the operation part 56 is operated. When an operation is performed with respect to the notebook computer 50 (step S34: YES), the control part 52 transmits a signal notifying the cancellation of the standby state to the power supplying device 20 (step S35).

When the control part 22 of the power supplying device 20 receives this signal, this control part restores an amount of electric power to be transmitted to the notebook computer 50 having sent this signal, to the value of electric power transmitted in step S4 of FIGS. 4 and 6 (step S36).

When the amount of electric power transmitted from the power supplying device 20 increases, the control part 52 of the notebook computer 50 performs processing of canceling the standby state and shifts to the normal operation (step S37).

As described above, when the operation is not performed for the constant time period with respect to the electronic device, the electronic device is shifted to the standby state to thereby reduce an amount of electric power transmitted to the electronic device from the power supplying device 20. Thus, energy saving can be attained.

In this modified example, the electronic device is shifted to the standby state when the operation is not performed for the constant time period. Thus, when a user wants to use the electronic device, the electronic device can be immediately restored to the normal operation. As a result, as compared with the fourth modified example, since it is not necessary to wait until the activation of the electronic device, a user can efficiently advance a work.

Incidentally, the processing of step S21 and the succeeding processing shown in FIG. 10 may be performed after step S72 in each of FIGS. 7 and 8.

In each of the aforesaid embodiment and modified examples, if the notebook computer 50 is stolen by a third party and activated for some reason, confidential or secret information may be leaked unfavorably.

In view of this, the electronic device is configured to mount a communication module for communicating with other devices via the network 30 and a position detection module for detecting the position on the earth. The control part 52 of the notebook computer 50 transmits, in response to the activation of the system thereof, positional information detected by the position detection module to a server connected to the network 30 from the communication module.

The database 40 registers in advance the positional information of the power supplying device 20 contained in the table 10. The server determines whether or not the positional information transmitted from the notebook computer 50 is registered in the database 40. When the transmitted positional information is not registered, it is determined that this notebook computer 50 is used outside the predetermined location. Then, the server remote-controls this notebook computer 50 so as to be placed in a locked state.

Alternatively, when the positional information transmitted from the notebook computer 50 is not registered in the database 40, the server transmits a mail denoting that the notebook computer 50 may be used without authorization to the mail address of a user of the notebook computer 50 registered in advance in the database 40. When confirming this mail, the user accesses the server using a mobile terminal etc. possessed by the user and locks the notebook computer 50 by remote control.

According to this configuration, even when the electronic device is used outside a predetermined location (for example, office), a user can know such the use and set the electronic device in an unusable state by remote locking. As a consequence, leakage etc. of confidential or secret information can be prevented and the safety can be secured.

The aforesaid explanation is made as to a case that the electronic device does not mount a battery and hence is operated by electric power transmitted from the power supplying device 20. However, the electronic device may mount a battery. For example, the electronic device may be configured in a manner that a battery is connected between the power reception circuit 51 and the power supply circuit 57, the battery is charged by electric power received by the power reception circuit 51, and electric power from the battery is supplied to the power supply circuit 57. In this configuration, the ID of the electronic device may be not stored in the wireless tag but stored in the memory 53 and may be transmitted to the power supplying device 20 from the short-range wireless communication part 54. Further, the activation of the electronic device may be performed manually.

As explained above, the specification of the present application discloses the following matters It is disclosed a power supply management method for an electronic device which can wirelessly receive electric power from a power supplying device having a plurality of electric power transmission parts each wirelessly transmitting electric power, including: an electric power transmission step of wirelessly transmitting electric power to the electronic device by the power supplying device; a step of receiving electric power transmitted from the power supplying device by the electronic device; a step of determining by the electronic device whether or not an amount of the electric power received from the power supplying device is equal to or larger than a threshold value necessary for activating a system of the electronic device; and a system activation step of activating by the electronic device the system when the amount of the received electric power is equal to or larger than the threshold value.

It is disclosed the power supply management method for the electronic device, in which in the system activation step, when the amount of received electric power is equal to or larger than the threshold value, the system is activated by the electronic device in a normal activation mode for fully activating the system using the electric power equal to or larger than the threshold value, and when the amount of received electric power is smaller than an amount of electric power necessary for the normal activation mode, the system is activated in an energy-saving activation mode for activating a part of the system using the electric power smaller than the threshold value.

It is disclosed the power supply management method for an electronic device, in which after activating the system in the energy-saving activation mode, when the amount of received electric power becomes equal to or larger than the amount of electric power necessary for the normal activation mode, remaining parts of the system having not been activated by the electronic device is activated.

It is disclosed the power supply management method for the electronic device, in which a plurality of the electronic devices include a master device which is used independently and a slave device which is used by being connected to the master device, and in the electric power transmission step, when the power supplying device transmits electric power to the master device to be connected to the slave device, electric power is transmitted to the slave device from the power supplying device.

It is disclosed the power supply management method for the electronic device, further including: a non-operation state detection step of detecting, by the electronic device receiving electric power from the power supplying device, a non-operation state where no operation is performed with respect to the electronic device for a predetermined time period; a trigger information transmission step of, after detecting the non-operation state, transmitting by the electronic device to the power supplying device trigger information as a trigger for performing a control of reducing an amount of electric power supplied to the electronic device; and a transmission electric power amount control step of reducing by the power supplying device an amount of electric power transmitted to the electronic device according to the trigger information.

It is disclosed the power supply management method for the electronic device, further including a step of outputting confirmation information for confirming whether or not the system of the electronic device may be shut-down by the electronic device when the non-operation state is detected, in which in the trigger information transmission step, the trigger information is transmitted to the power supplying device when information permitting shutdown of the system is inputted according to the confirmation information, and in the transmission electric power amount control step, transmission of electric power is stopped by the power supplying device to the electronic device according to the trigger information.

It is disclosed the power supply management method for the electronic device, further including a step of shifting the electronic device to a standby state when the non-operation state is detected, in which in the trigger information transmission step, standby-shift information denoting that the electronic device is going to shift or shifted to the standby state is transmitted to the power supplying device as the trigger information, and in the transmission electric power amount control step, after completion of shift of the electronic device to the standby state, an amount of electric power supplied by the power supplying device to the electronic device is reduced than an amount of electric power supplied before the shift to the standby state according to the standby shift information.

It is disclosed the power supply management method for the electronic device, in which the electronic device does not mount a battery charging electric power for activating the system and is operated by electric power transmitted from the power supplying device.

It is disclosed a power supply management program executable by a computer, including the respective steps performed by the electronic device in the power supply management method for the electronic device.

It is disclosed an electronic device, including: an electric power receiving unit which wirelessly receives electric power from a power supplying device that includes a plurality of electric power transmission units each for wirelessly transmitting electric power; a determination unit which determines whether or not an amount of the electric power received by the electric power receiving unit is equal to or larger than a threshold value necessary for activating a system of the electronic device; and an activation control unit which activates the system when the amount of received electric power is equal to or larger than the threshold value.

It is disclosed the electronic device, in which when the amount of received electric power is equal to or larger than the threshold value, the activation control unit activates the system in a normal activation mode for fully activating the system using the electric power equal to or larger than the threshold value, and when the amount of received electric power is smaller than an amount of electric power necessary for the normal activation mode, the activation control unit activates the system in an energy-saving activation mode for activating a part of the system using the electric power smaller than the threshold value.

It is disclosed the electronic device, in which after activating the system in the energy-saving activation mode, when the amount of received electric power becomes equal to or larger than the amount of electric power necessary for the normal activation mode, the activation control unit activates remaining parts of the system having not been activated.

It is disclosed the electronic device, further including: a wireless communication unit which wirelessly communicates with the power supplying device; and a trigger information transmission control unit which, when no operation is performed with respect to the electronic device for a predetermined time period in a state of receiving electric power from the power supplying device, transmits from the wireless communication unit to the power supplying device trigger information as a trigger for performing by the power supplying device a control of reducing an amount of electric power supplied to the electronic device.

It is disclosed the electronic device, further including a confirmation information output unit which, when no operation is performed with respect to the electronic device for the predetermined time period in the state of receiving electric power from the power supplying device, outputs confirmation information for confirming whether or not the system of the electronic device may be shut-down, in which the trigger information transmission control unit transmits the trigger information to the power supplying device when information permitting shutdown of the system is inputted according to the confirmation information.

It is disclosed the electronic device, further including an electric power control unit which, when no operation is performed with respect to the electronic device for the predetermined time period in the state of receiving electric power from the power supplying device, shifts the electronic device to a standby state, in which the trigger information transmission control unit transmits as the trigger information, to the power supplying device, information denoting that the electronic device is going to shift or shifted to the standby state.

It is disclosed the electronic device, in which the electronic device does not mount a battery charging electric power for activating the system and is operated by electric power transmitted from the power supplying device.

It is disclosed a power supplying device, including: a plurality of electric power transmission units each for wirelessly transmitting electric power; and an electric power transmission control unit which transmits electric power to electronic devices from the electric power transmission units, in which the electronic devices include a master device which is used independently and a slave device which is used by being connected to the master device, and the electric power transmission control unit transmits electric power to the slave device only when electric power is transmitted to the master device to be connected to the slave device.

It is disclosed the power supplying device, further including: a wireless communication unit which wirelessly communicates with the electronic device; a trigger information receiving unit which receives, via the wireless communication unit, trigger information which is transmitted from the electronic device being supplied with electric power when no operation is performed with respect to the electronic device for a predetermined time period; and an electric power supply amount control unit which performs a control of reducing an amount of electric power supplied to the electronic device according to the trigger information.

It is disclosed the power supplying device, in which the electric power supply amount control unit stops supply of electric power to the electronic device according to the trigger information.

It is disclosed the power supplying device, in which the trigger information receiving unit receives, as the trigger information, standby-shift information denoting that the electronic device is going to shift or shifted to a standby state, and the electric power supply amount control unit, after completion of shift of the electronic device to the standby state, reduces an amount of electric power supplied to the electronic device than an amount of electric power supplied before the shift to the standby state according to the standby shift information.

According to any one of the matters discussed above, the power supply management method for the electronic devices which can efficiently advance works such as a conference can be provided.

As described above, although the explanation is made as to the particular embodiment and modified examples, the invention is not limited thereto and can be modified in various manners in a range not departing from the disclosed technical concept of the invention.

This application is based on Japanese Patent application (Japanese Patent application No. 2012-164997) filed on Jul. 25, 2012, the contents of which is incorporated herein by reference.

What is claimed is:

1. A power supply management method for the electronic device which can wirelessly receive electric power from a power supplying device having a plurality of electric power transmission parts each wirelessly transmitting electric power, comprising:
   an electric power transmission step of wirelessly transmitting electric power to the electronic device by the power supplying device;
   a step of receiving electric power transmitted from the power supplying device by the electronic device;
   a step of determining by the electronic device whether or not an amount of the electric power received from the power supplying device is equal to or larger than a threshold value necessary for activating a system of the electronic device;
   a system activation step of activating by the electronic device the system when the amount of the received electric power is equal to or larger than the threshold value;
   a non-operation state detection step of detecting, by the electronic device receiving electric power from the power supplying device, a non-operation state where no operation is performed with respect to the electronic device for a predetermined time period;
   a trigger information transmission step of, after detecting the non-operation state, transmitting by the electronic device to the power supplying device trigger information as a trigger for performing a control of reducing an amount of electric power supplied to the electronic device;
   a transmission electric power amount control step of reducing by the power supplying device an amount of electric power transmitted to the electronic device according to the trigger information; and
   a step of outputting confirmation information for confirming whether or not the system of the electronic device may be shut-down by the electronic device when the non-operation state is detected, wherein
   in the trigger information transmission step, the trigger information is transmitted to the power supplying device when information permitting shutdown of the system is inputted according to the confirmation information, and
   in the transmission electric power amount control step, transmission of electric power is stopped by the power supplying device to the electronic device according to the trigger information.

2. A power supply management method for the electronic device which can wirelessly receive electric power from a power supplying device having a plurality of electric power transmission parts each wirelessly transmitting electric power, comprising
   an electric power transmission step of wirelessly transmitting electric power to the electronic device by the power supplying device;
   a step of receiving electric power transmitted from the power supplying device by the electronic device;
   a step of determining by the electronic device whether or not an amount of the electric power received from the power supplying device is equal to or larger than a threshold value necessary for activating a system of the electronic device;
   a system activation step of activating by the electronic device the system when the amount of the received electric power is equal to or larger than the threshold value;
   a non-operation state detection step of detecting, by the electronic device receiving electric power from the power supplying device, a non-operation state where no operation is performed with respect to the electronic device for a predetermined time period;
   a trigger information transmission step of, after detecting the non-operation state, transmitting by the electronic device to the power supplying device trigger information as a trigger for performing a control of reducing an amount of electric power supplied to the electronic device;
   a transmission electric power amount control step of reducing by the power supplying device an amount of electric power transmitted to the electronic device according to the trigger information; and
   a step of shifting the electronic device to a standby state when the non-operation state is detected, wherein
   in the trigger information transmission step, standby-shift information denoting that the electronic device is going to shift or shifted to the standby state is transmitted to the power supplying device as the trigger information, and in the transmission electric power amount control step, after completion of shift of the electronic device to the standby state, an amount of electric power supplied by the power supplying device to the electronic device is reduced than an amount of electric power supplied before the shift to the standby state according to the standby shift information.

3. An electronic device, comprising:
an electric power receiving unit which wirelessly receives electric power from a power supplying device that includes a plurality of electric power transmission units each for wirelessly transmitting electric power;
a determination unit which determines whether or not an amount of the electric power received by the electric power receiving unit is equal to or larger than a threshold value necessary for activating a system of the electronic device;
an activation control unit which activates the system when the amount of received electric power is equal to or larger than the threshold value;
a wireless communication unit which wirelessly communicates with the power supplying device; and
a trigger information transmission control unit which, when no operation is performed with respect to the electronic device for a predetermined time period in a state of receiving electric power from the power supplying device, transmits from the wireless communication unit to the power supplying device trigger information as a trigger for performing by the power supplying device a control of reducing an amount of electric power supplied to the electronic device, wherein
when the amount of received electric power is equal to or larger than the threshold value, the activation control unit activates the system in a normal activation mode for fully activating the system using the electric power equal to or larger than the threshold value, and
when the amount of received electric power is smaller than an amount of electric power necessary for the normal activation mode, the activation control unit activates the system in an energy-saving activation mode for activating a part of the system using the electric power smaller than the threshold value.

4. The electronic device according to claim 3, wherein after activating the system in the energy-saving activation mode, when the amount of received electric power becomes equal to or larger than the amount of electric power necessary for the normal activation mode, the activation control unit activates remaining parts of the system having not been activated.

5. An electronic device, comprising:
an electric power receiving unit which wirelessly receives electric power from a power supplying device that includes a plurality of electric power transmission units each for wirelessly transmitting electric power;
a determination unit which determines whether or not an amount of the electric power received by the electric power receiving unit is equal to or larger than a threshold value necessary for activating a system of the electronic device;
an activation control unit which activates the system when the amount of received electric power is equal to or larger than the threshold value;
a wireless communication unit which wirelessly communicates with the power supplying device;
a trigger information transmission control unit which, when no operation is performed with respect to the electronic device for a predetermined time period in a state of receiving electric power from the power supplying device, transmits from the wireless communication unit to the power supplying device trigger information as a trigger for performing by the power supplying device a control of reducing an amount of electric power supplied to the electronic device; and
a confirmation information output unit which, when no operation is performed with respect to the electronic device for the predetermined time period in the state of receiving electric power from the power supplying device, outputs confirmation information for confirming whether or not the system of the electronic device may be shut-down, wherein
the trigger information transmission control unit transmits the trigger information to the power supplying device when information permitting shutdown of the system is inputted according to the confirmation information.

6. An electronic device, comprising:
an electric power receiving unit which wirelessly receives electric power from a power supplying device that includes a plurality of electric power transmission units each for wirelessly transmitting electric power;
a determination unit which determines whether or not an amount of the electric power received by the electric power receiving unit is equal to or larger than a threshold value necessary for activating a system of the electronic device;
an activation control unit which activates the system when the amount of received electric power is equal to or larger than the threshold value;
a wireless communication unit which wirelessly communicates with the power supplying device;
a trigger information transmission control unit which, when no operation is performed with respect to the electronic device for a predetermined time period in a state of receiving electric power from the power supplying device, transmits from the wireless communication unit to the power supplying device trigger information as a trigger for performing by the power supplying device a control of reducing an amount of electric power supplied to the electronic device; and
an electric power control unit which, when no operation is performed with respect to the electronic device for the predetermined time period in the state of receiving electric power from the power supplying device, shifts the electronic device to a standby state, wherein
the trigger information transmission control unit transmits as the trigger information, to the power supplying device, information denoting that the electronic device is going to shift or shifted to the standby state.

7. A power supplying device, comprising:
a plurality of electric power transmission units each for wirelessly transmitting electric power; and
an electric power transmission control unit which transmits electric power to electronic devices from the electric power transmission units, wherein
the electronic devices include a master device which is used independently and a slave device which is used by being connected to the master device, and
the electric power transmission control unit transmits electric power to the slave device only when electric power is transmitted to the master device to be connected to the slave device, wherein the trigger information receiving unit receives, as the trigger information, standby-shift information denoting that the electronic device is going to shift or shifted to a standby state, and the electric power supply amount control unit, after completion of shift of the electronic device to the standby state, reduces an amount of electric power supplied to the electronic device than an amount of electric power supplied before the shift to the standby state according to the standby shift information.

* * * * *